United States Patent Office 3,200,646
Patented Aug. 17, 1965

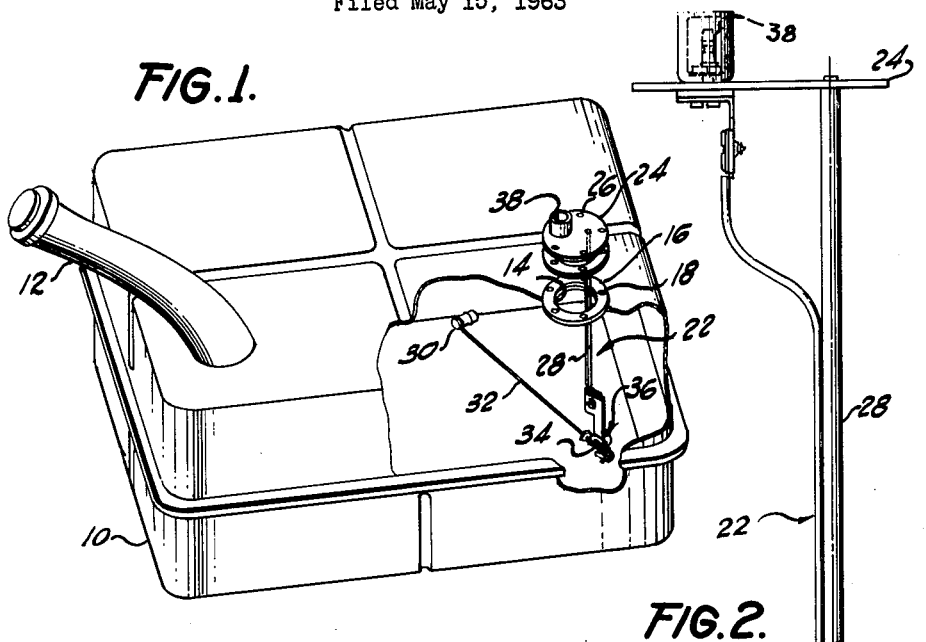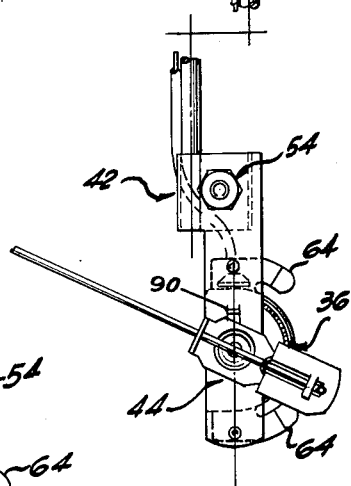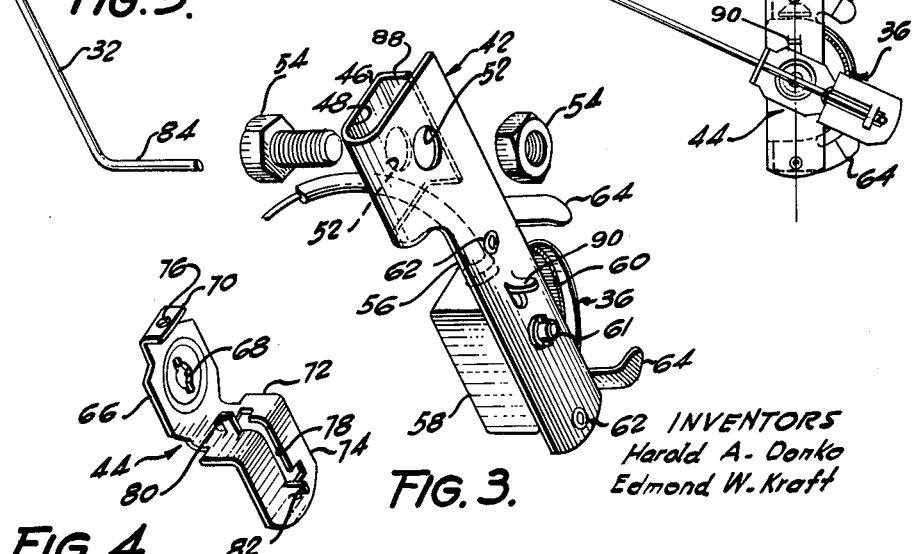

3,200,646
UNIVERSAL LIQUID LEVEL INDICATING
DEVICE FOR A FUEL TANK
Harold A. Donko, Chicago, and Edmond W. Kraft, Hoffman Estates, Ill., assignors to Stewart-Warner Corporation, Chicago, Ill., a corporation of Virginia
Filed May 15, 1963, Ser. No. 280,581
6 Claims. (Cl. 73—317)

This invention relates to a liquid level indicating device for a fuel tank, and more particularly, to such a device that can be used universally on substantially all fuel tanks independently of the size or shape of the particular tank.

Liquid level indicating devices commonly are used to indicate the depth of liquid fuel in a fuel tank. The indicating device includes a float, a float arm connected at one of its ends to the float, and support means connected at the opposite end of the float arm to support both the float and the float arm rotatably inside the tank. Since the float rides near the surface of the liquid, a change of fuel depth in the tank causes the float arm to rotate through a limited angle about the support means. Sending means, operated by the tilting of the float arm, are calibrated fo reach fuel tank to indicate what percentage of maximum tank capacity the particular angle of tilt represents.

The float and float arm of the indicating device are fitted through an opening in the tank and supported inside the tank by bolting a cover plate of the support means to the tank over the opening. Conventionally, the hole pattern about the tank opening is irregular so that the cover plate can be secured in only one rotatable position relative to the tank. Since the support means is fixed to the cover plate, fixing the position of the cover plate locates the plane of tilt of the float and float arm. Also, the length of the float arm and the maximum included angle of tilt determine the depth range of the particular indicating device.

Generally, each indicating device is made to fit on its particular fuel tank, and because of its fixed depth and plane of tilt relative to its flanged cover plate, can be used only on a limited number of different fuel tanks. Consequently, to have a sufficient inventory of indicating devices to cover the many sizes and types of fuel tanks commonly used become a large if not overwhelming task.

The subject device provides a design for a liquid level indicating device usable on substantially every fuel tank independently of the size or shape of the tank, and independently of the location of the tank opening or the relation of its hole pattern relative thereto. Thus, one basic indicating device is readily and universally usable on all conventional fuel tanks.

In order that this invention can be more fully appreciated, reference is herein made to the drawings, wherein:

FIG. 1 is a broken away perspective view showing a typical fuel tank for an automotive vehicle, and the liquid level indicating device in preassembled relationship to the tank;

FIG. 2 is an enlarged side elevational view of the subject indicating device as shown generally in FIG. 1;

FIG. 3 is a perspective view of a clamping member and rheostat used in the subject indicating device;

FIG. 4 is a perspective view of a mounting bracket used in the subject indicating device; and FIG. 5 is a perspective view of the end portion of the float arm used in the subject indicating device.

FIG. 1 shows a fuel tank 10 of typical construction having side, bottom and top wall confinements defining a fluid-tight interior. An inlet spout 12 communicates with the interior of the tank 10 in the conventional manner. The tank further includes an opening 14 surrounded by annular flange 16 having therein mounting hole pattern 18. Conventionally, the hole pattern 18 is irregular so that a correspondingly flanged cover plate can be secured to the flange 16 only in one rotatable position relative to the tank.

A liquid level indicating device, generally shown at 22, typically includes a cover plate 24 flanged with a hole pattern 26 similar to the hole pattern 18 on tank flange 16. A support post or bar 28 secured to the cover plate 24 extends to within the tank. Float 30 is supported by float arm 32, which in turn, is pivotally connected at pivot connection 34 to the support bar 28. A rheostat or the like 36, actuated responsive to the tilting action of the float arm 32 about the pivot connection 34, completes a control circuit including the rheostat 36 and exterior terminal 38 in flange cover plate 24 to some external gauge or the like (not shown).

Referring more specifically to the particular improvement of the subject indicating device, the support bar 28 is a conventional cylindrical bar uniform and plain along its length. The pivot structure 34 is provided by a separate clamping bracket 42 secured to the lower end of the support bar 28, and a mounting bracket 44 pivoted to the clamping bracket 42 and supporting the inner end of the float arm 32. The clamping bracket 42 includes a generally L-shaped plate member having one leg portion 46 bent over on itself forming thereby a socket 48 adapted to receive the support bar 28. Aligned openings 52 in the leg and the body portion of the bracket provide for receipt of tightening bolt and nut means 54. The positioned bolt maintains the support bar 28 against the closed end of the socket 48 to clamp the clamping bracket 42 to the bar.

The rheostat 36 (FIG. 3) secured to leg 56 of the clamping bracket includes a case 58 housing a circular coil 60 annularly of shaft 61. The shaft 61 supports a wiper (not shown) which engages the circular coil 60, and also forms a pivot support for the mounting bracket 44. The case 58 of rheostat 36 is secured by rivets 62 to the leg 56 of the clamp bracket. Spaced stops 64 on the case 58 limit the rotation of the mounting bracket 44 relative to the clamping bracket 42.

The mounting bracket 44 (FIG. 4) is elongated and includes an intermediate portion 66 having keyway opening 68 therein adapted to be keyed to the shaft 61 of the rheostat 36. Spaced legs 70 and 72 are bent to generally right angles from the intermediate portion 66, the lower leg 72 further having a portion 74 bent at a right angle thereto in a direction away from the top leg 70. The top bend 70 has an opening 76 therein; while the bottom bends 72 and 74 have an elongated slot 78, the top portion of which is aligned with opening 76. Tabs 80 and 82 are provided adjacent the opposite ends of the slot 78, but spaced therefrom by approximately the thickness of the float arm 32.

The float arm 32 is adapted to be secured at its inner end to the mounting bracket 44. FIG. 5 shows the float arm 32 bent at end 84 transverse to the longitudinal axis of the float arm, the end 84 being slightly longer than the lower leg 72 of the mounting bracket. Thus, on assembly, the transverse bend 84 can be fitted through the top opening 76 in leg 70 into the aligned slot 78 until it bottoms on the lower portion of the slot. The tabs 80 and 82 can then be bent across the slot against the interposed float arm 32 to confine the float arm at three spaced nonaligned locations. This axially and rotatably secures the arm relative to the mounting bracket 44. The float end of the float arm 32 has a shepherd's hook 85 which can readily grasp the float 30 for a quick detachable connection.

The disclosed liquid level indicating device 22 is universally adaptable for a fuel tank, generally independently of the size or depth of the tank, or the location of the top opening of the tank. For example, the support bar 28 and float arm 32 each can be made to a basic length, or if required, to several incrementally different lengths. The lengths of the particular arm or bar can then be cut as required to suit the depth of the particular tank. This ensures that the float arm 32 will sweep its maximum angle for causing a full scale contact on the rheostat 36. Since no specific angle or proportions is required in bend 84 to provide a tight mechanical connection with the mounting bracket 44, this particular fabrication can be readily performed by hand for in the field installation. The rotatable position of the clamping bracket 42 relative to the tank is adjustable as required by merely twisting the bracket on the cylindrical support bar 28. It will be noted that the leg portion 46 of the clamping bracket has an integrally formed lip 88, which abuts the main body of the bracket and so that the space defined by socket 48 conforms to the diameter of standard 28. The bracket 42 also has an integrally formed stop 90 thereon which cooperates with bracket 44 to limit the angular rotation thereof in opposite directions and thereby ensures that the rheostat wiper arm does not disengage from the rheostat winding.

While only a single embodiment of the subject invention has been shown, it will be obvious that many modifications can be made therein without departing from the inventive scope thereof. Accordingly, it is desired that the invention be limited only by the scope of the claims hereinafter following.

What is claimed is:

1. For use with a fuel tank of generally independent size and depth having a top opening flanged with a conventional irregularly spaced hole pattern, the improvement being a universally adaptable liquid level indicator device, comprising a flange cover plate having a hole pattern corresponding with the conventional hole pattern and adapted to be connected to the tank over the top opening, a round bar secured at one of its ends to the cover plate within the confines of the top opening and projecting towards its other end away generally normal to the cover plate, a clamping bracket, adjustable means to secure the clamping bracket to the bar frictionally at any adjustable distance from the cover plate and at any rotatable position relative to the hole pattern thereof, a mounting member, means pivoting the mounting member to the clamping bracket to rotate through a limited angle about a rotational axis transverse to the longitudinal axis of the bar, said mounting member including at least two portions spaced apart in a direction transverse to the rotational axis, said portions each lying in a plane parallel to said rotational axis and having aligned openings with one of said portions having an offset section thereon extending transverse to said rotational axis and also having an opening lying in a plane common to said aligned openings, said opening in said offset section being continuous with the opening in said one portion so as to define a slot, a float, a float arm formed of a generally round bar member, said float arm having means at its opposite ends adapted to be connected to the float and to the mounting member, the connection means for the float including a shepherd's hook adapted to surround and detachably grasp the float, the connection means for the mounting member including the float arm extending through the aligned openings in the mounting member and having its end portion bent transverse to its longitudinal axis to be received through said aligned openings including said slot whereby the transverse bend in said float arm is held between the side walls of said slot to prevent rotation of said float arm, tab means on the mounting member adjacent at least one of the openings bendable against the float arm to lock the float arm rotatably and axially relative to the mounting member, said float arm being adjustable as to its length by cutting off the inner portion spaced from the float and forming the previous mentioned transverse bend as required, and rheostat control means actuated by the rotation of the mounting member responsive to changes in the level of the liquid in the tank.

2. For use with a fuel tank of generally independent size and depth having a top opening flanged with a conventional irregularly shaped hole pattern, the improvement being a universally adaptable liquid level indicator device, comprising a flange cover plate having a hole pattern corresponding with the conventional hole pattern and adapted to be connected to the tank over the top opening, a support bar secured to the flange cover plate within the confines of the top opening and projecting transverse thereto, a clamping bracket, adjustable means to secure the clamping bracket to the support bar frictionally at any adjustable distance from the flange cover plate and at any rotatable position relative to the hole pattern thereof, a mounting member, means pivoting the mounting member to the clamping bracket to rotate through a limited angle about a rotational axis transverse to the longitudinal axis of the support bar, said mounting member having a pair of spaced legs extending parallel to said rotational axis with each leg having a passageway in alignment with the passageway in the other leg, a transverse portion on one of said legs with said transverse portion having a last passageway formed therein extending transverse to said rotational axis and in a common plane with said aligned pair of passageways, a float, a float arm, said float arm having means at its opposite ends adapted to be connected to the float and to the mounting member, the connection means for the mounting member including the float arm having its end portion bent transverse to its longitudinal axis to seat in said last passageway after passage through said aligned passageways for preventing rotation of said float arm and float about the axis of said float arm, tab means on the mounting member bendable against the float arm to lock the float arm axially relative to the mounting member, said float arm being adjustable as to its desired length by cutting off the inner portion spaced from the float and forming the previous mentioned transverse bend as required, and rheostat control means actuated by the rotation of the mounting member responsive to changes in the level of the liquid in the tank.

3. A bracket for enabling the use of a conventional round float arm adapted to have a transverse bend formed at one end and carrying a float at its opposite end in gasoline tanks of varying size which are adapted to receive a depending standard to which said bracket is adapted to be rotatably connected for controlling a rheostat carried by said standard in accordance with the angular displacement of said bracket and float arm, the improvement comprising a pair of spaced apart legs on said bracket adapted to project in a direction transverse to the axis of said standard with one of said legs having a transverse portion thereon generally parallel to the axis of said standard, aligned passageways in said legs and a last passageway in said transverse portion lying in a common plane with said aligned passageways whereby the transverse bend on said float rod is adapted to be seated in said last passageway on passage of said rod through said aligned passageways to permit rotation of said rod only about the axis of the rotatable connection between said bracket and standard.

4. The bracket claimed in claim 3, in which the passageway in said leg having said transverse portion is continuous with said passageway in said transverse portion, and tabs are provided on said bracket adjacent opposite ends of said continuous passageway for preventing displacement of said rod from said passageway.

5. A clamping bracket for use in a fuel tank of indeterminate volume and and slope and having a top opening adapted to receive a cylindrical standard in only one angular position for introducing a liquid level sensing device rotatably carried by said clamping bracket into said fuel tank, said clamping bracket comprising a planar wall upon which said sensing device is mounted, an encircling leg integrally formed on said bracket folded to define one wall spaced from said planar wall by a distance corresponding to the diameter of said standard and an integrally formed end wall extending toward said planar wall at a position permitting receipt of said standard between said encircling leg and said planar wall, and a pair of aligned passageways in said planar wall and one wall for receiving a fastening device to clamp said bracket to said cylindrical standard with said standard held between said planar wall and one wall and said integrally formed end wall abutting said planar wall.

6. A bracket for rotatably suspending an elongate round float arm having an offset end in a tank of indeterminate volume for ascertaining the level of a liquid in said tank, said bracket comprising a planar wall having means enabling rotatable suspension of said wall in said tank about an axis perpendicular to said planar wall, a pair of legs integrally formed on said wall and spaced on opposite sides of said axis, each leg having a passageway aligned with the passageway in the other leg, and a transverse portion on one of said legs extending parallel to said planar wall and having a last passageway in a common plane with said aligned passageways and offset therefrom whereby said round elongate float arm is prevented from rotating about its elongate axis in response to the positioning of said arm in said pair of passageways with said offset end in said last passageway.

References Cited by the Examiner

UNITED STATES PATENTS

| | | | |
|---|---|---|---|
| 714,377 | 11/02 | Jeavons | 73—317 |
| 852,422 | 5/07 | Danquard | 287—93 |
| 1,072,122 | 9/13 | Johnston | 73—317 |
| 1,075,510 | 10/13 | Smith | 73—317 |
| 1,479,858 | 1/24 | Jenney | 73—318 |
| 1,591,481 | 7/26 | Frank | 73—318 |
| 2,508,290 | 5/50 | Poetsch | 73—322.5 X |
| 2,923,156 | 2/60 | Young | 73—313 |

FOREIGN PATENTS 21,910  1907  Great Britain.

ISAAC LISANN, *Primary Examiner.*